A. D. GOETZ.
CART SADDLE.
APPLICATION FILED AUG. 29, 1910.
1,001,840.
Patented Aug. 29, 1911.
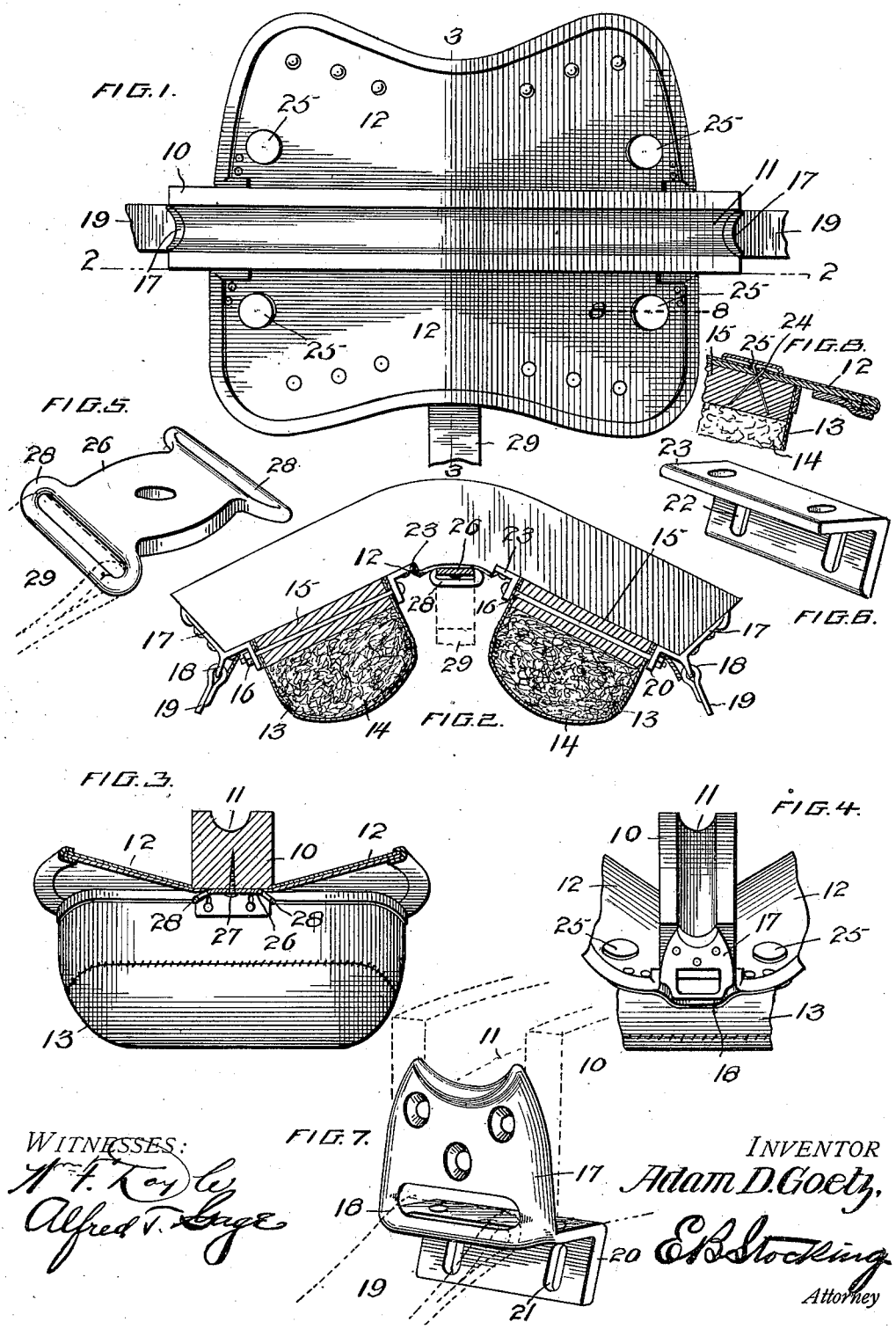

UNITED STATES PATENT OFFICE.

ADAM D. GOETZ, OF CHARLESTOWN, WEST VIRGINIA.

CART-SADDLE.

1,001,840.     Specification of Letters Patent.     Patented Aug. 29, 1911.

Application filed August 29, 1910. Serial No. 579,429.

*To all whom it may concern:*

Be it known that I, ADAM D. GOETZ, a citizen of the United States, residing at Charlestown, county of Jefferson, State of West Virginia, have invented certain new and useful Improvements in Cart-Saddles, of which the following is a specification, reference being had therein to the accompanying drawing.

This invention relates to a cart saddle and particularly to means for adjustably mounting thereon pads to contact with the animal to which the saddle is applied.

The invention has for an object to provide a novel and improved construction of angle iron mounted upon the yoke of the saddle and upon which the pads are adjustably secured and mounted to conform to the motion of the animal to relieve the strain of the load upon the supporting means which extends over the yoke of the saddle.

Other and further objects and advantages of the invention will be hereinafter set forth and the novel features thereof defined by the appended claims.

In the drawing—Figure 1 is a plan of the invention; Fig. 2 is a section on line 2—2 of Fig. 1; Fig. 3 is a section on line 3—3 of Fig. 1; Fig. 4 is a side elevation of the saddle; Fig. 5 is a detail perspective of the crupper loop; Fig. 6 is a similar view of the angle iron for supporting the pad; Fig. 7 is a detail perspective of the angle iron carried by the yoke; and Fig. 8 is a detail section on line 8—8 of Fig. 1.

Like numerals of reference refer to like parts in the several figures of the drawing.

The numeral 10 designates the yoke of the saddle which may be of any desired construction or configuration but is preferably formed of wood and provided with a groove 11 upon its upper surface adapted to receive a chain, or other supporting means, from the shafts of a vehicle. At opposite sides of this yoke, saddle flaps or housings 12 are secured by any desired means. The yoke 10 has adjustably mounted thereon at opposite sides of its center, pads 13 which are filled with suitable yielding material 14 and provided with a securing block 15 through which a bolt 16 extends. The outer ends of the yoke are provided with angle irons 17 secured thereto in any desired manner and these irons are provided with a loop 18 adapted to receive the girth strap 19, as shown in Fig. 7. This angle iron is provided with a depending flange 20 having elongated openings 21 through which the securing bolts from the pads extend to permit adjustment and free movement of the pads in the motion of the animal. The opposite end of the bolt 16 extends through elongated slots 22 formed in an angle plate 23 secured to the yoke. The pads 13 are also secured to the flaps 12 by means of a driven fastening device such as a nail 24 and a coöperating headed similar fastening device 25 driven at an angle thereto, as shown in Fig. 8. The yoke 10 is also provided with a plate 26 pivotally mounted thereon by means of a screw 27 or other adjustable device and is provided at its opposite ends with loops 28 from one of which a crupper strap 29 extends. This screw connection permits the plate 26 and the crupper strap carried thereby to be reversed in position when it is desired to reverse the saddle to compensate for wear or other purposes. This construction permits the pads to be adjusted and left free to move with the motion of the animal, thereby relieving the strain of the load upon the yoke and, if desired, the pads can be adjusted and secured in any position for that purpose. The angle irons upon the yoke provide for the connection with the girth straps and prevent wear upon the yoke of the chain or the supporting means extending from the shafts of the vehicle while the crupper plate provides a reversible connection by which the crupper strap may be used in proper position even though the saddle be reversed.

The invention presents a simple, efficient and economically constructed form of cart saddle particularly adapted for adjustment to the back of an animal and for the connection of the girth and crupper straps thereto.

Having described my invention and set forth its merits, what I claim and desire to secure by Letters Patent is—

1. In a cart saddle, the combination of a yoke, a housing secured thereto, pads disposed at opposite sides of said yoke, angle irons secured to said yoke and provided with slotted apertures for slidingly adjusting said pads laterally to said yoke, and pad supporting means carried by said pads and mounted in said slots.

2. In a cart saddle, the combination of a yoke, a housing secured thereto, pads disposed at opposite sides of said yoke, angle irons secured to said yoke and provided with slotted apertures for adjustably securing said pads to said yoke, and a loop provided upon one of said irons to receive a girth strap.

3. In a cart saddle, a yoke, irons carried by said yoke, pads adjustably mounted intermediate of said irons for movement laterally of the yoke, flexible housings carried by said yoke, and securing means extending through said irons and pads.

4. In a cart saddle, a yoke, angle irons secured to the opposite ends thereof and provided with slotted flanges, pads disposed in contact with the under surface of said yoke, angle irons disposed at the inner edges of said pads and secured to said yoke, and bolts extending through said irons and said pads.

5. In a cart saddle, a yoke, angle irons secured to the opposite ends thereof and provided with depending slotted flanges, pads, angle irons secured to said yoke at the inner side of said pads and formed with slotted flanges, and bolts extended through said slotted flanges for securing said pads in position.

6. In a cart saddle, a yoke, an iron secured to one end thereof and provided with a strap-attaching loop and a depending flange formed with elongated apertures therein.

7. In a cart saddle, a yoke provided with a grooved upper face, irons disposed at the opposite ends of said yoke and provided with wearing faces in alinement with said groove, strap loops extended outwardly from said irons at each end of said yoke, a slotted flange depending from said irons beneath said yoke, and a pad mounted upon said flange.

In testimony whereof I affix my signature in presence of two witnesses.

ADAM D. GOETZ.

Witnesses:
C. HORACE GALLAHER,
GEO. B. GOETZ.

Copies of this patent may be obtained for five cents each, by addressing the "Commissioner of Patents, Washington, D. C."